United States Patent [19]

Kreczko et al.

[11] Patent Number: 4,982,761
[45] Date of Patent: Jan. 8, 1991

[54] VALVED QUICK CONNECT/DISCONNECT COUPLING

[75] Inventors: Gregory Kreczko, Hudson; Ross L. Wagner, Akorn, Richard J. Medvick, Shaker Hts., all of Ohio

[73] Assignee: Swagelok-Quick Connect Co., Hudson, Ohio

[21] Appl. No.: 369,070

[22] Filed: Jun. 20, 1989

[51] Int. Cl.⁵ .................................. F16L 37/28
[52] U.S. Cl. .......................... 137/614.03; 285/313; 285/316
[58] Field of Search ............ 137/614.02, 614.03, 137/614.04; 285/313, 316

[56] References Cited

U.S. PATENT DOCUMENTS

| | | | |
|---|---|---|---|
| 2,208,286 | 7/1940 | Berger | 285/315 |
| 2,381,962 | 8/1945 | Krone et al. | 285/169 |
| 2,413,978 | 1/1947 | Krone et al. | 285/168 |
| 2,425,500 | 8/1947 | Wiggins | 285/315 |
| 2,727,759 | 12/1955 | Elliott | 285/315 |
| 2,837,352 | 6/1958 | Wurzburger | 137/614.03 |
| 2,888,278 | 5/1959 | Torres et al. | 285/313 |
| 2,951,713 | 9/1960 | Hoffstrom | 137/614.03 |
| 2,952,482 | 9/1960 | Torres | 285/313 |
| 3,028,179 | 4/1962 | Abramoska | 285/317 |
| 3,039,794 | 6/1962 | De Cenzo | 285/315 |
| 3,097,867 | 7/1963 | Saloum | 137/614.03 |
| 3,113,588 | 12/1963 | Torres | 137/614.06 |
| 3,123,099 | 3/1964 | Breuning et al. | 137/614.06 |
| 3,234,965 | 2/1966 | Anderson | 137/614.04 |
| 3,367,366 | 2/1968 | Oliveau et al. | 137/614.05 |
| 3,435,848 | 4/1969 | Johnston | 137/614.04 |
| 3,847,393 | 12/1974 | Busselmeier | 285/315 |
| 4,086,939 | 5/1978 | Wilcox et al. | 137/614.03 |
| 4,596,272 | 6/1986 | Medvick et al. | 137/614.03 |
| 4,637,432 | 1/1987 | Medvick et al. | 137/614.03 |
| 4,693,497 | 9/1987 | Pettus et al. | 137/614.03 |

Primary Examiner—A. Michael Chambers
Attorney, Agent, or Firm—Fay, Sharpe, Beall, Fagan, Minnich & McKee

[57] ABSTRACT

A coupling comprises a hollow body with a valve supported therein to define an annular chamber for receiving a mating stem component. A slide sleeve is mounted for axial movement in the annular chamber to control flow past the valve. Carried on the slide sleeve is a wiper mounted for sliding movement and having an end face which generally fills the open end of the annular chamber. A pair of slide hooks act to engage the stem member and move the slide member to a closed position when the coupling is disconnected. The slide hooks extend through slots in the wiper and are held in engaged position in the slide sleeve by cooperating surfaces on the hooks and the wiper. A pair of opposed dog-type detent members are maintained in a radially outward position by the outer surface of the wiper when the coupling is disconnected. In addition, the body and a cooperating operating sleeve are provided with a generally elliptical cross-section which results in a stronger coupling design and facilitates guiding of the components.

51 Claims, 7 Drawing Sheets

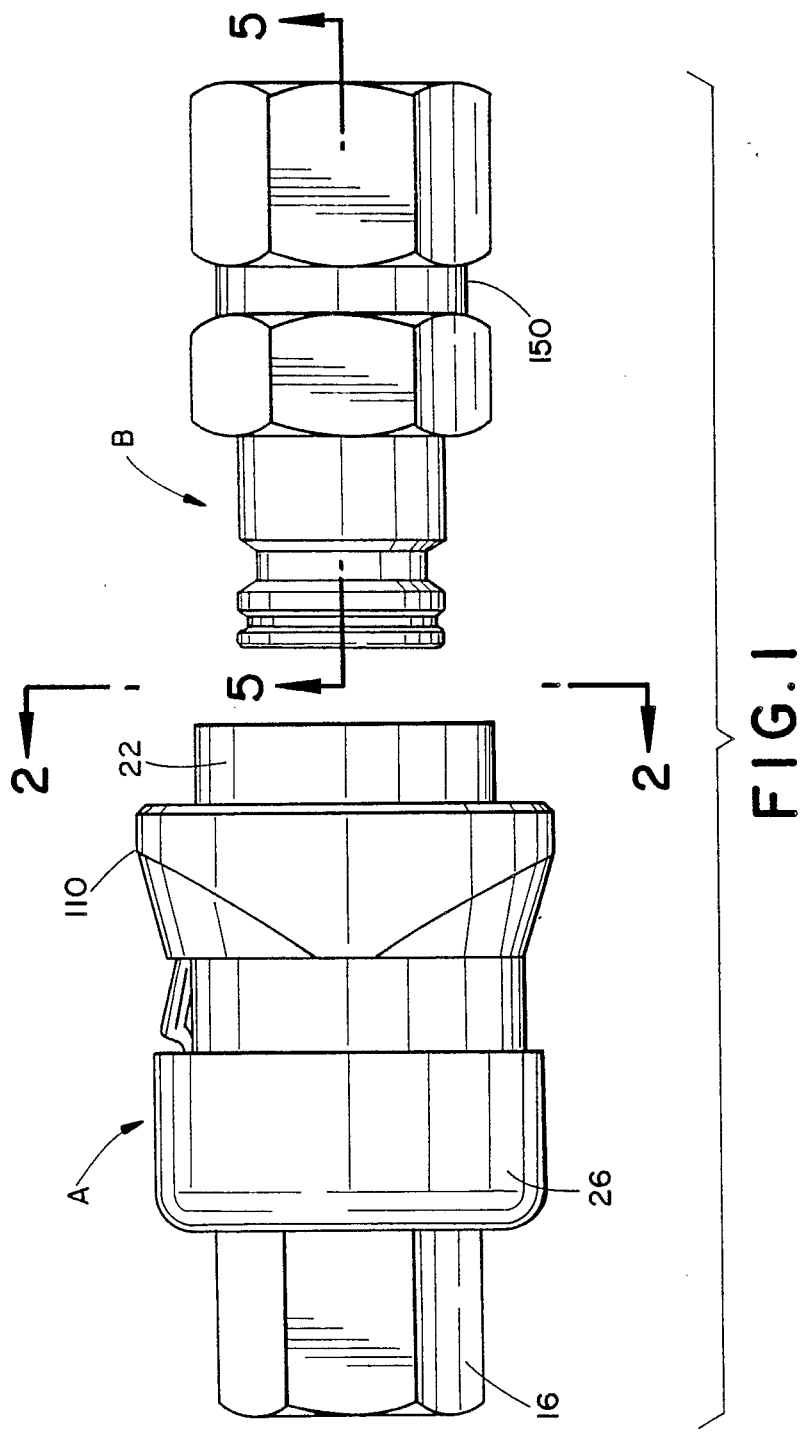

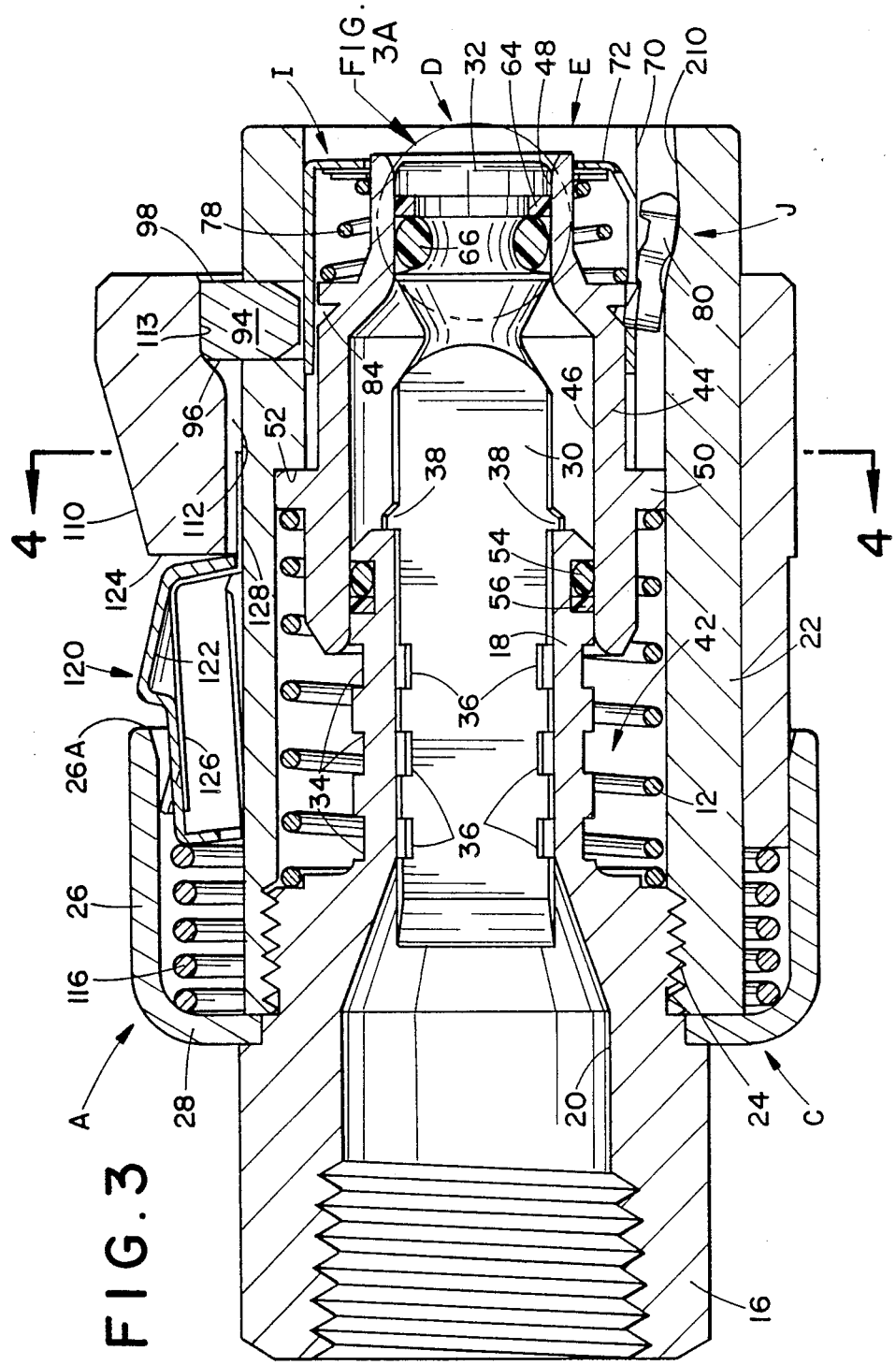

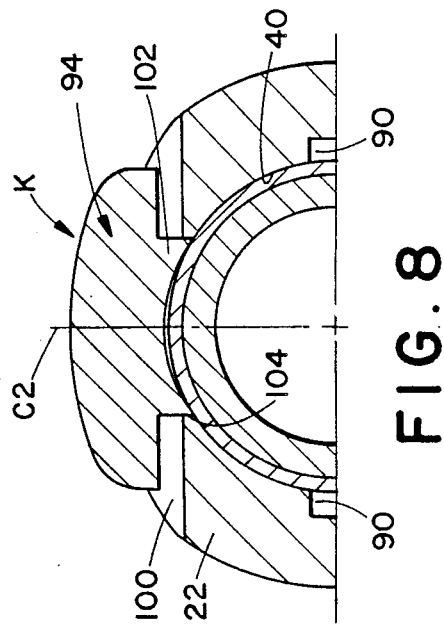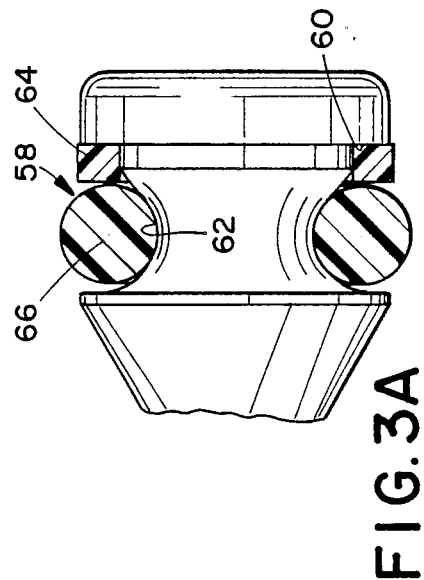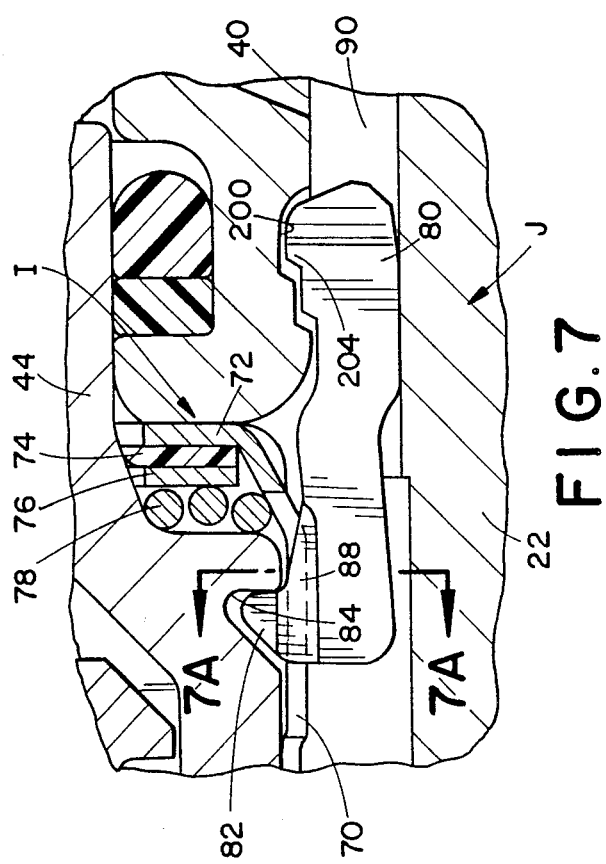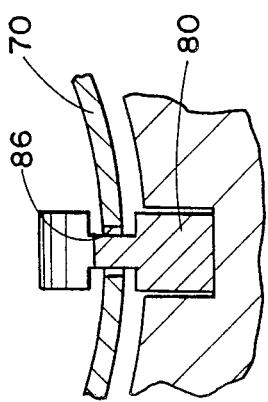

VALVED QUICK CONNECT/DISCONNECT COUPLING

BACKGROUND OF THE INVENTION

The subject invention is directed toward the art of valved couplings and, more particularly, to a quick connect/disconnect coupling design. The invention is particularly applicable to couplings of the type described when used for high pressure hydraulic systems and will be described with particular reference thereto; however, it will be appreciated that features and embodiments of the invention have broader aspects and may be used with other fittings or fluid devices such as valves, check valves, tube connectors or the like. In addition, quick connect/disconnect couplings of the type here under consideration herein can be used as is well known for many different types of fluid systems.

Quick connect/disconnect couplings of the type generally contemplated herein are shown and described in commonly assigned U.S. Pat. Nos. 4,596,272 and 4,637,432. The disclosure of these prior U.S. patents is incorporated herein by reference. Generally, however, the coupling assemblies shown therein include cooperating body and stem coupling assemblies comprising interfitting female and male components respectively. The body or female coupling assembly has an axially movable slide which moves from a closed position engaging a body valve when the assemblies are in a disconnected relationship to a position wherein the slide is open and spaced from the body valve when the two coupling assemblies are in a connected position. The slide is continually biased toward a closed position so that it automatically closes when the coupling assemblies are disconnected. Moreover, positive slide moving catch means are provided such that as the male or stem coupling assembly is moved to a disconnected position the slide is positively moved to a closed position.

The couplings of the prior patents also include a safety catch and interlock mechanism which greatly reduces the possibility of inadvertent disconnection of the coupled components. In particular, the disconnect assembly requires two separate movements in two directions before release can take place.

The subject invention incorporates features of the two prior U.S. patents in a simplified structure which also permits significant improvements in both operation and strength to be achieved while retaining the beneficial aspects of the prior designs.

BRIEF DESCRIPTION OF THE INVENTION

In accordance with one aspect of the subject invention, a coupling member for a quick connect/disconnect coupling is provided which includes an elongated hollow body having a longitudinal axis and a body valve internally supported therein to define an annular chamber having an axially open end for receiving a mating stem coupling component. A cylindrical slide is supported by the body for axial movement in the annular chamber between a closed position engaging the body valve to an open position axially displaced therefrom. Associated with the cylindrical slide and movable axially relative thereto is a generally cylindrical wiper member which has an end face which generally fills the open end of the annular chamber when the coupling member is in a disconnected condition. In addition, at least one slide closing hook member is provided for moving the cylindrical slide to the closed position during disconnection from the mating coupling member. The slide closing hook has a body located radially outwardly of the cylindrical wiper member and a finger portion which extends radially inwardly through an elongated slot or opening in the cylindrical wiper member to drivingly engage with the cylindrical slide.

Preferably, and in accordance with a more limited aspect of the invention, interengaging surface means are provided between the cylindrical wiper member and the hook to prevent radial separation of the hook and the wiper member while permitting relative axial movement therebetween.

The interrelationship between the cylindrical wiper member, the slide, and the slide closing hook, results in an arrangement wherein the open annular end of the body member is closed by the cylindrical wiper member when the component is in a disconnected condition. Moreover, however, total functioning of the automatic slide closing hook can take place even with the addition of the wiper member. In addition, the wiper member preferably has a resilient sealing lip which extends inwardly into sliding engagement with the outer surface of the cylindrical slide to thereby maintain the slide in a clean condition and prevent the entry of dirt and foreign materials into the inner chamber of the coupling component.

Preferably, and in accordance with a more limited aspect of the invention, the slide closing hook member is maintained in position by cooperating interengaging surfaces on the cylindrical wiper member and the hook. The interengaging surfaces are such as to allow free relative axial movement of the hook relative to the wiper member so that proper functioning of each component can take place.

In accordance with a more limited aspect of the invention, the coupling member also preferably includes a plurality of radially movable locking dog members which are carried by the body radially outward of the annular chamber for selectively connecting the coupling member to the mating stem coupling component. An operating sleeve surrounds the body and is axially movable thereon for controlling the radial movement of the locking dogs and maintaining them in their inward locked position when the coupling component and its mating coupling component are in a connected relationship. Preferably, the wiper member and the locking dogs are related such that when the coupling component is in a disconnected position the wiper member moves to a axial location wherein it acts to limit the radial inward movement of the locking dogs to maintain them spaced radially outward sufficiently to allow connection with the stem coupling component to take place.

In accordance with a still further aspect of the invention, a coupling member for quick connect/disconnect coupling is contemplated which includes a first elongated hollow body member having a longitudinal axis and defining a generally cylindrical chamber opening axially outwardly of the end of the body. An internal valve member supported in the chamber axially thereof is arranged to cooperate with a cylindrical slide member which can move between a closed position engaging the valve and an open position axially spaced from the valve. Locking dog type detent means are carried on diametrically opposite sides of the body in radially extending openings which permit movement of the detent means along a radial path between a first radially inner position for connecting a cooperating coupling component and a second radially outer position for permitting disconnection of the cooperating coupling component. An operating sleeve is positioned about the body for sliding movement axially thereof to move the detent means to a first position and maintain them therein while the coupling components are in their connected position. Preferably, the hollow body is provided with a generally oval or elliptical cross-section in planes perpendicular to the longitudinal axis with the major axis of the elliptical cross-section lying generally perpendicular to the radial path of movement of the detent means.

Preferably, and in accordance with a further aspect of the invention, the operating sleeve which controls the movement of the detents also has a generally elliptical outer cross-section in planes perpendicular to the longitudinal axis. It is positioned such that the major axis of its elliptical cross-section is perpendicular to the major axis of the body. The generally oval or elliptical configuration of the body and the sleeve offers distinct advantages for the subject design. In particular, the oval body and oval sleeve maintain their orientation relative to one another after assembly without requiring any special guides, grooves or the like. Additionally, the oval shapes permit the user of the assembly to rapidly ascertain the location of the sleeve and the safety operating button and the like. Moreover, the non-circular or elliptical cross-section part permit the material of the housing to be located where it is most needed and further allows the overall envelope of the resulting assembly to be reduced.

In accordance with a more limited aspect of the invention, the coupling member preferably includes a plurality of the latch dog type detent members with each of the members being received in respective slots formed through the body transversely of the longitudinal axis. Preferably, each of the slots has a rectangular inner opening which joins the slot with the annular chamber. Moreover, each of the latch dog detent members also has a rectangular end portion which extends through the opening in the annular chamber. The rectangular opening and the rectangular portion on the latch dog detent members are sized and related such that the rectangular portion of the detent dog is always in the rectangular inner opening throughout all radial movement of the dog members. This assures lateral support for the locking dogs when they are displaced radially outward. A benefit of this arrangement is that the locking dog bearing area and strength can be increased without decreasing the overall strength of the housing. This arrangement works in conjunction with the elliptical or oval configuration of the housing end slot to produce a coupling assembly which has great strength and is particular suited for extremely high pressure use.

As can be seen from the foregoing, a primary object of the invention is the provision of a quick connect/disconnect coupling design which is highly effective and particularly suited for extremely high pressure use.

A further object of the invention is the provision of a quick connect/disconnect coupling of the type described wherein the housing and operating slide component have an extremely efficient design which permits the body material to be most efficiently utilized.

Another object of the invention is the provision of a quick connect coupling wherein slide closing hooks are related to a slide wiper member in a manner which allows the outer open end of the coupling to be closed during the periods when the coupling is in a disconnected relationship.

A still further object of the invention is the provision of a coupling of the general type described wherein the wiper member further functions to maintain the locking dogs in their outer position during periods when the coupling is disconnected.

Yet another object of the invention is the provision of a quick connect/disconnect type coupling which can be provided with a keyed arrangement to allow only selected coupling pairs to be joined in flow relationship.

Yet another object is the provision of a coupling of the general type described wherein the body and operating slide have a non-circular cross section that facilitate use of the coupling assembly.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein:

FIG. 1 is a side elevational view showing the body and stem coupling components in a disconnected position but aligned preparatory to being connected;

FIG. 3 is a longitudinal cross-sectional view taken on line 3—3 of FIG. 2 and showing the internal construction and elements of the body component of the coupling assembly;

FIG. 3A is an enlarged view of the end portion of the body valve element D (the seal elements are shown in a non-sealed condition);

FIG. 7 is a greatly enlarged view of the circled area of FIG. 6;

FIG. 7A is a cross sectional view taken on line 7A—7A of FIG. 7;

FIG. 8 is a cross-sectional view taken on line 8—8 of FIG. 6; and,

DETAILED DESCRIPTION OF THE PREFERRED EMBODIMENT

Figure 4:
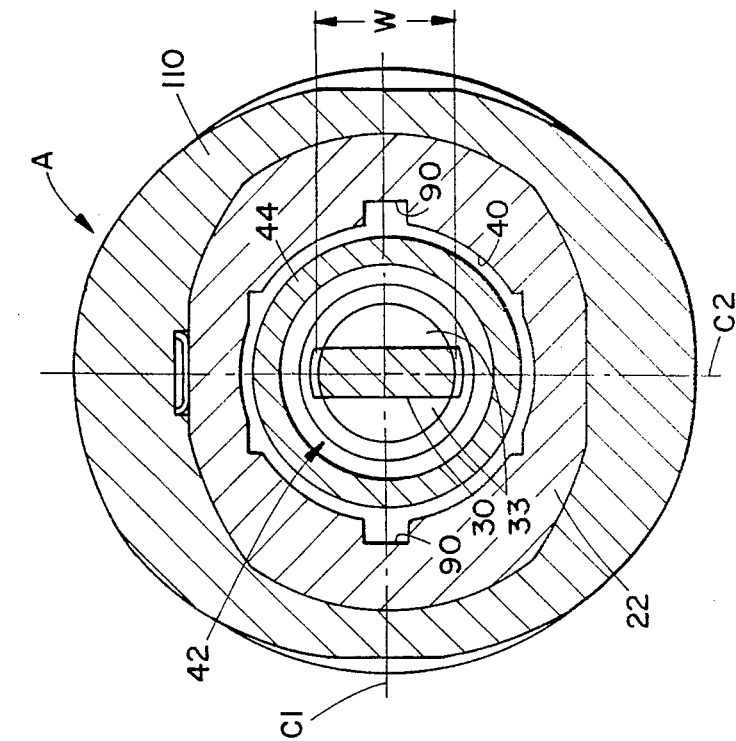
FIG. 4 is a cross-sectional view taken on line 4—4 of FIG. 3.

Referring now to the drawings wherein the showings are for the purpose of illustrating a preferred embodiment of the invention and not for the purpose of limiting same, FIG. 1 shows a mating pair of body and stem coupling members or assemblies A and B respectively. In the FIG. 1 showing the coupling components are in a disconnected relationship but in alignment such that they are about to be connected upon movement axially toward one another.

As best illustrated in FIG. 3, the body assembly A includes a main body assembly C which has a generally annular configuration and carries a body valve element D axially therein. A slide valve assembly E is carried within the annular chamber and mounted for axial sliding movement between an axially outer position (as shown in FIG. 3) wherein it is sealingly engaged with the valve element D to a leftward position wherein flow can take place through the assembly. The slide sleeve assembly E is normally continually biased to the right as illustrated in FIG. 3 by a compression type coil spring 12.

Figure 5:
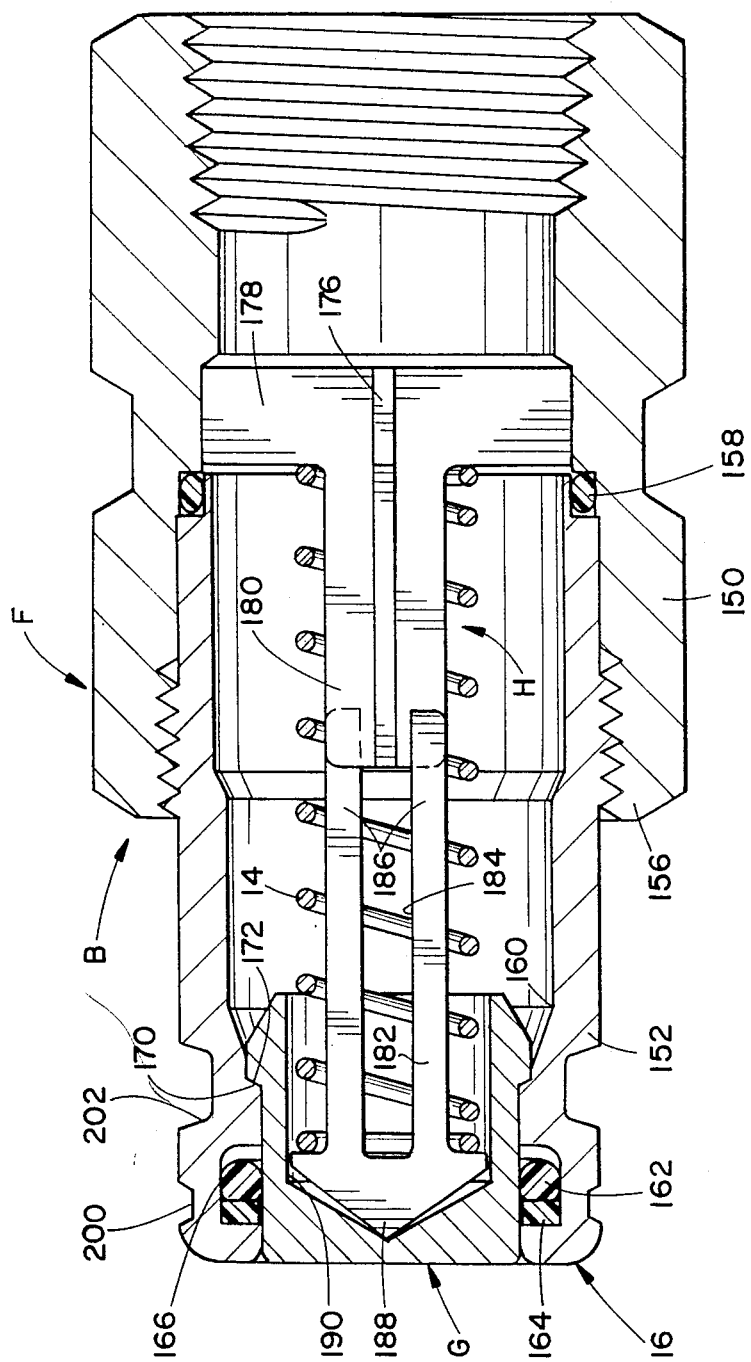
FIG. 5 is a longitudinal cross-sectional view of the stem coupling component (the view is taken on line 5—5) of FIG. 1.

Referring to FIG. 5, it will be seen that the stem assembly B includes an elongated hollow stem body assembly F which houses a poppet valve element G that is carried and guided by a guide assembly H. An elongated compression type coil spring 14 functions to maintain the poppet element G continually biased to the left hand closed position illustrated in FIG. 5. In this position, the poppet element G cooperates with the seal assembly 16 to close the passage through the stem body assembly F.

Figure 6:
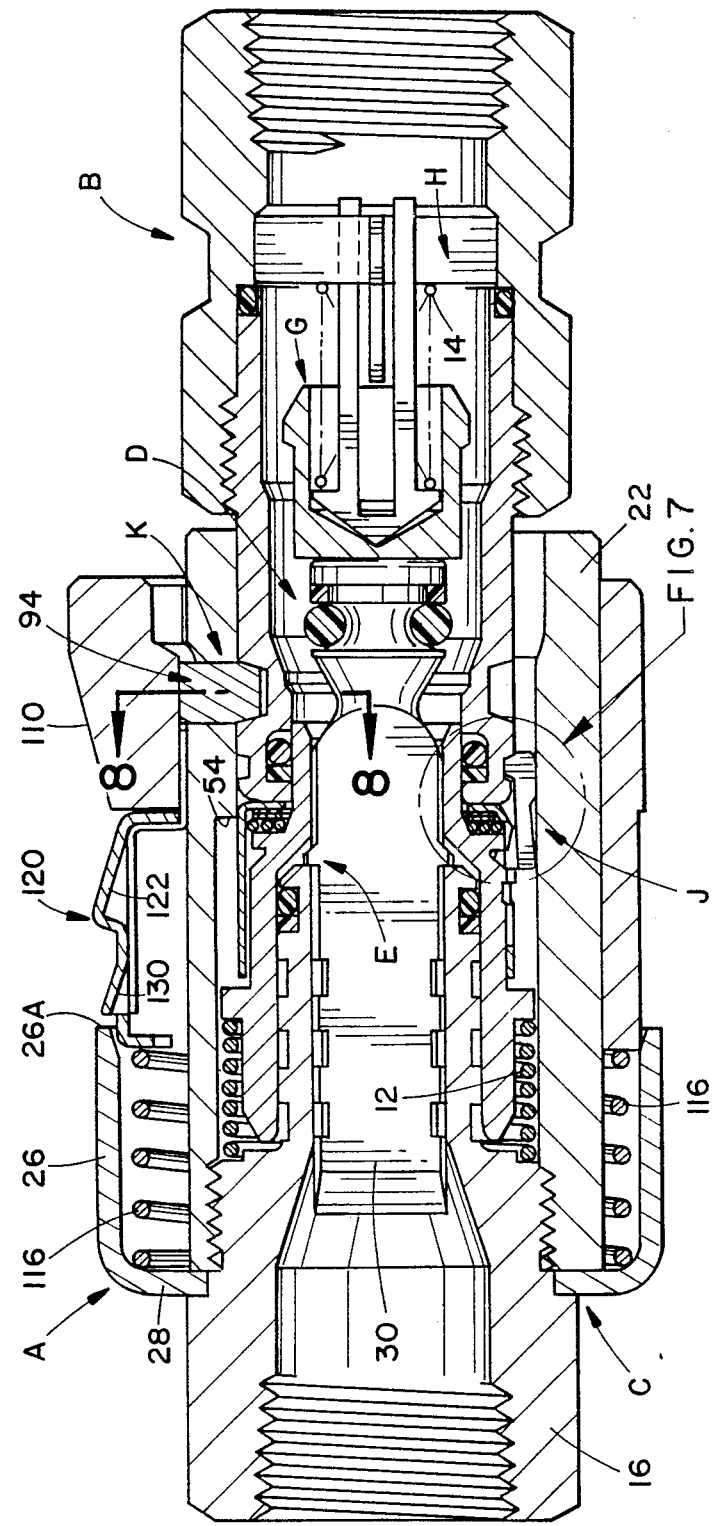
FIG. 6 is a longitudinal cross-sectional view of the coupling assembly showing the stem and body components in a connected position.

When a pair of mated body and stem assemblies are to be joined they are positioned in the aligned relationship illustrated in FIG. 1. As they are brought axially together to move them to the coupled position illustrated in FIG. 6, it will be seen that the small diameter stem end of the stem body assembly F comes into engagement with the outer end of slide assembly E of body assembly A. As the two components are moved toward one another, the slide sleeve assembly E is moved to a left hand position as illustrated in FIG. 6. Simultaneously with this final assembly movement, the poppet valve element G is driven to the right against the bias of spring 14. As the assemblies are moved to the FIG. 6 position, sleeve hook assemblies J and the locking dog detent assemblies K move to their locked positioned to maintain the components in the coupled condition of FIG. 6. When the assemblies are in their coupled or connected position, the parts are arranged generally as shown in FIG. 6 and fluid flow can take place through the connected assemblies.

Referring again more particularly to FIGS. 2 through 4, the overall arrangement of the body component A and its preferred form of construction will be described. As illustrated therein, the body C of body assembly A generally comprises a first body component 16 which has a reduced diameter right hand end portion 18 and a central stepped diameter passage 20 formed therethrough. The left hand end of passage 20 is provided with suitable threads or other connecting means to allow the body assembly A to be connected to associated fluid lines. Joined to body component 16 is an outer sleeve like body component 22. In the embodiment under consideration, the body component 22 is releasably joined to body component 16 by suitable threads 24. It should also be noted that a relatively short cylindrical abutment sleeve or housing member 26 having a radially inwardly extending flange 28 is located radially outwardly of the left hand end (as viewed in FIG. 2) of the body component 22. As can be seen, it is held and clamped in position by having its inwardly extending end flange 28 captured between the threadedly connected body components 16 and 22.

Fixedly mounted within the reduced diameter end portion of body component 16 is the body valve assembly D. Body valve assembly D includes an elongated rigid body or bolt portion 30 which terminates in a generally cylindrical valve section 32. As best shown in FIG. 4, the body section 30 is generally flat and of a width "W" to be closely received in the reduced diameter portion of passage 20. This results in a pair of flow passages 33 on opposite sides of the bolt portion 30. In the embodiment under consideration, the body valve D is mechanically joined to body component 16 by three axially displaced equal crimps 34. In particular, the exterior of the bolt portion 30 of the body valve D is provided with three equally spaced grooves slots 36 on each lateral edge thereof. The material of the reduced diameter section of body 16 is thereafter mechanically crimped into the grooves 36 firmly locking the body valve D in position. In conjunction with this assembly, it should be noted that the body 30 includes radially outwardly extending shoulder or flange portions 38 which are located at a diameter greater than the internal diameter of the reduced diameter section of passageway 20. Additionally, this assists in locating the bolt portion 30 for the crimping operation, the radial dimension of the sections 38 is greater than the minimum internal diameter of the slide sleeve assembly E. As will subsequently be apparent, this acts to prevent the body valve from being expelled from the assembly if failure occurs.

Figure 2:
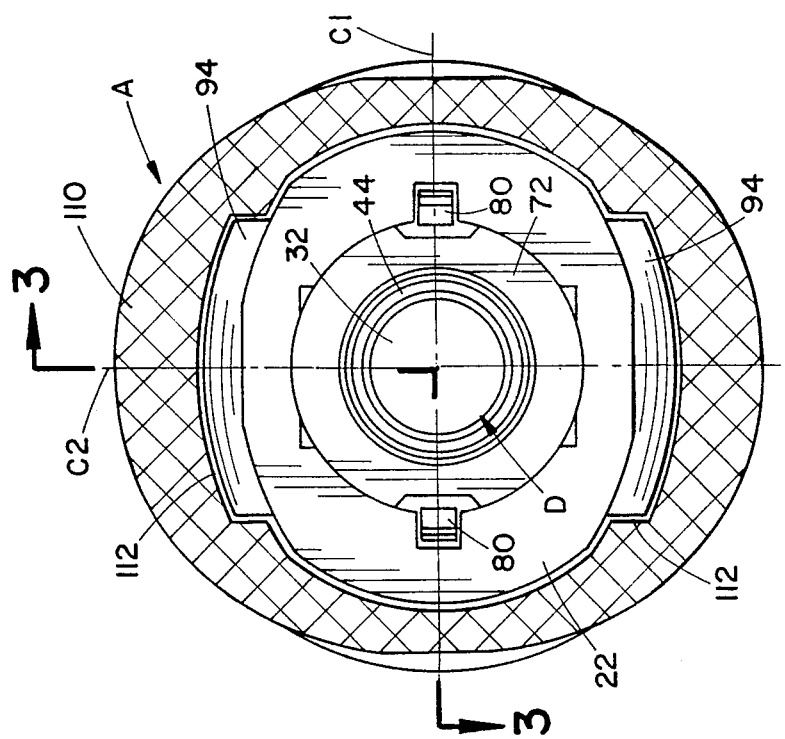
FIG. 2 is an end view of the body coupling component taken on line 2—2 of FIG. 1.

As best shown in FIGS. 2 and 4, body component 22 preferably has a generally elliptical or oval exterior shape in planes perpendicular to the longitudinal axis. It is positioned with the major axis to the ellipse to extend coextensive with centerline $C_1$. The minor axis is, of course, located on centerline axis $C_2$. The center of element 22 has a cylindrical bore 40 which cooperates with the reduced diameter section of component 16 to define an outwardly open annular chamber 42.

Mounted within annular chamber 42 for axial sliding movement on the reduced diameter section of body section 16 is the previously mentioned slide sleeve assembly E. The assembly E comprises a generally cylindrical slide sleeve member 44 which has a stepped internal passageway including a first section 46 which is sized to be closely received on the exterior of the reduced diameter section of body section 16. A reduced diameter section 48 is sized so as to closely and sealingly receive the cylindrical end section 32 of the body valve D in the manner illustrated in FIG. 3. It should be noted that the exterior of sleeve 44 has a radially outward extending flange 50 which is sized to be received closely within the major internal diameter of body section 22. Slide sleeve member 44 is continually biased to the right hand position illustrated in FIG. 3 by the previously mentioned compression spring 12. Movement to the right is limited by engagement of the flange 50 with the internal shoulder 52 formed in body section 22. The arrangement of the flange 50 and internal shoulder 52 which limits movement of the sleeve member 44 produces both structural and functional advantages. More particularly, because the body bolt 30 is not required to restrain the sleeve member 44, the bolt can be small and of lesser cross-section thus allowing greater flow area and reduced flow resistance. In addition, with the subject design axial pressure thrust is contained and resisted by the body section 22 in both the coupled and uncoupled conditions. Because of this, no additional material or strength considerations are required.

A suitable 0-ring seal 54 and a backup ring 56 are carried within an external circumferential groove formed on the right hand end of the reduced diameter section of body component 16. This provides a fluid tight seal between the sliding surfaces of the sleeve member 44 and the reduced diameter section of body member 16.

Sealing between the right hand and/or cylindrical portion 32 of the body valve D and the interior reduced diameter section 48 of the slide element 44 is accomplished by an improved seal assembly best illustrated in FIG. 3A. As shown in FIG. 3A, the cylindrical section 32 of the body valve D is provided with a circumferentially extending contoured groove 58 including a relatively shallow axially outward groove section 60 and a significantly deeper groove section 62. This arrangement allows use of a continuous Teflon ring 64 to function as a backup ring for the associated 0-ring seal element 66. As can be seen from FIG. 3A, the arrangement of the contoured groove 58 is such that the effective outer diameters of the backup ring and 0-ring are the same but they can have significantly different internal diameters. This allows the use of a continuous backup ring of relatively low elasticity teflon since the backup ring is not required to be greatly elongated during its installation in the backup ring portion of the groove 58. Thus, a solid backup ring can be employed in a one piece 0-ring groove in conjunction with an 0-ring having a large wire diameter to toroidal diameter ratio. This, of course, provides distinct operating advantages without increasing manufacturing problems.

Figure 9:
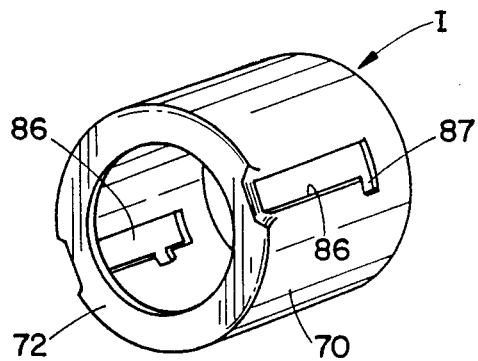
FIGS. 9 through 13 are pictorial views of various coupling components.
Figure 10:
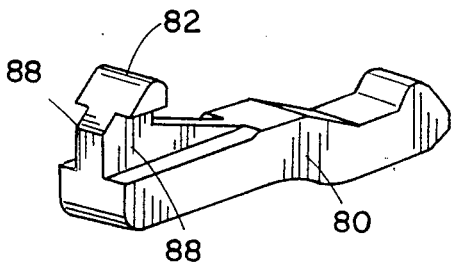

With particular importance to the subject invention is the construction of the slide hook assembly J and its operational relationship to the wiper can assembly I. Referring in particular to FIGS. 3, 7 and 9, the overall arrangement of the wiper can assembly I can be understood. As shown therein, the wiper can assembly I includes a generally cylindrical thin metal can like element 70 having a cylindrical configuration and a radially inwardly extending forward flange or end wall 72. The main body portion of the can member 70 has an opened internal diameter sized so as to allow it to be closely and slidably received on the outer surface of the intermediate portion of sleeve member 44. The inner diameter of the flange end section 72 is, however, only slightly larger than the outer diameter of the reduced diameter outer end portion of the sleeve 44. The relationship of the end face 72 to the body member 22 and the sleeve 44 is best illustrated in FIG. 2. Note that the end wall or flange 72 acts to substantially completely fill or, in effect, close the outer end of the body member A when the coupling is in a disconnected condition as shown in FIGS. 2 and 3. This prevents dirt and foreign materials from entering into the internal mechanism of the coupling. To further enhance this function of the wiper can element 70 a circumferentially continuous resilient wiper member 74 is carried by the flange section 72 and is sized so that its inner diameter is slightly smaller than the outer diameter of the end section of member 44. This produces a movable seal and wiping element as the can element 70 is axially moved relative to the sleeve member 44. The resilient wiper member 74 is firmly maintained in position adjacent the flange 72 by a metal backup ring 76 which is maintained in engagement against the rear side of the wiper ring 74 by a compression spring 78. As best seen in FIG. 3, the compression spring 78 has a generally conical shape and acts between a shoulder on sleeve member 44 and the backup ring 76. Additionally, the compression spring 78 acts to maintain the wiper can element 70 continually biased toward the open outer end of the body assembly A.

The limit of outer movement of the wiper can assembly I is defined by the slide hook assembly J. As illustrated in FIGS. 2, 3, 7 and 10, the subject device uses two slide hook members 80 located on diametrically opposite sides of the sleeve member 44. The hook members 80 have the overall configuration best seen in FIG. 10 and include an inwardly extending hook portion 82 which is received in a circumferential groove 84 formed in sleeve 44 at the general location illustrated. The hook member 80 are maintained in engagement with the groove 84 by their relationship with the cylindrical wiper can 70. As illustrated in FIGS. 7, 7A, and 9 the wiper can element 70 includes elongated slots 86 through which the hook members 82 extend. Additionally, each hook member 80 is provided with inwardly extending side grooves 88 that receive the sides of the slot 86. As illustrated in FIG. 9, entry of the hook 82 during assembly can take place through a slightly widened part 87 in the slot 86. The relationship thus far described allow the wiper can element to move axially relative to the slide hook while permitting the hook 80 to maintain positive engagement with the groove 84 in the slide 44. Additionally, as best illustrated in FIGS. 2 and 4, the slide hooks 80 and the wiper can 70 are axially guided by elongated slots 90 formed radially outward from the interior surface of bore 40 of body member 22. As illustrated, the grooves are located in diametrically opposite sides and are sized so as to closely receive the sides of the respective slide hooks 80. This maintains the slide hooks oriented in the position shown and prevents rotation of the wiper can assembly I.

Figure 11:
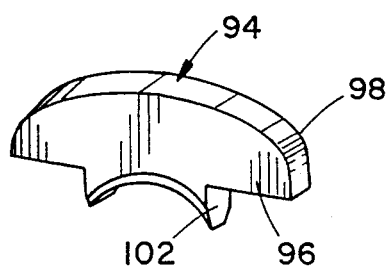

The relationship of the slide hook elements 80 to the stem coupling component B will subsequently be described in conjunction with the description of the stem coupling component. For the present, however, and continuing with the description of the body component assembly A, the assembly further includes the locking dog detent assembly K which functions to maintain the body assembly A and the stem assembly in the connected relationship shown in FIG. 6 until it is desired to release the locking dogs As best illustrated in FIGS. 2, 3 and 8 there are two locking dog elements 94 positioned on diametrically opposite sides of body assembly A and mounted for radial movement toward and away from the axial centerline along centerline $C_2$. The locking dogs 94 have the general configuration best shown in FIG. 11. In particular, the locking dogs 94 have opposed generally parallel side walls 96 and 98 (see FIG. 3) which are sized so as to be closely and slidably received in a transversely extending slot 100 formed through body component 22. The slots 100 guide the radial movement of the dog 94 and constrain them against undesired axial movement. The locking dogs are constrained against circumferential movement by having a lower rectangular end section 102 which extends through a rectangular opening connecting between slot 100 and the annular chamber within member 22. This rectangular opening is provided by a longitudinally extending slot 104 formed from the inner wall 40 of member 22.

The radial movement of the locking dogs 98 is controlled by an external control sleeve 110 which is mounted for axial sliding movement between an outermost coupled position illustrated in FIG. 6 and an innermost uncoupled position illustrated in FIG. 3. In the embodiment under consideration, the control sleeve 110, as well as the previously discussed body component 22, is formed from powdered metal and has the exterior configuration best seen in FIGS. 1 through 4. As illustrated therein, sleeve 110 has an internal open configuration to closely receive the exterior of body component 22. The exterior configuration of control sleeve 110 preferably has an oval or generally elliptical shape with the major axis of the ellipse extending in the direction of centerline $C_2$. As is apparent from FIGS. 2 and 4, the oval or elliptical exterior surfaces of the body component 22 and the oval inner opening of control sleeve 110 maintains the desired circumferential orientation between these components and, further, allows the body end sleeve to have maximum strength in those areas and directions where such strength is required.

As illustrated in FIGS. 2 and 3, the operating sleeve 110 includes a longitudinally extending groove 112 that is positioned to engage the lateral ends of the dogs 94. In addition, the groove is contoured as best shown in FIG. 3. Note that the groove 112 has a maximum radial depth at the outer end to permit the individual dogs 94 to assume their radial outermost position and permit the sleeve element 44 to assume the right hand closed position. However, when the components are in the coupled position shown in FIG. 6, the sleeve 44 and the wiper can element 70 are in their maximum left hand position and the dog elements 9 have then moved radially inward into engaged position with the stem portion 152 of stem assembly B as illustrated.

In order to allow the control sleeve 110 to properly perform its function, it is maintained under a continual bias to the right toward the position shown in FIG. 6. Movement to the right is limited by engagement of the axially inner end of groove 112 with the radial outer edge of the associated dog elements 94. Biasing of the operating sleeve 110 is accomplished by a compression spring 116 which acts between the end wall 28 of sleeve 26 and the end of the sleeve 110.

Figure 12:
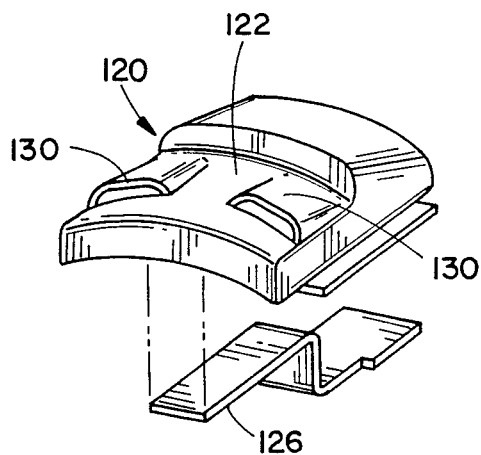

In order to permit the coupled assembly to be uncoupled from the position shown in FIG. 6, it is necessary to slide the operating sleeve 110 to the left to bring the radially outer sections 113 of grooves 112 into alignment with their respective locking dog. This position is shown in FIG. 3. In order to move the operating sleeve 110 to the position shown in FIG. 3, it must be moved against the bias of the spring 116. In addition, the subject device includes a lock button assembly 120 which prevents inadvertent release movement of the slide 110 by requiring a separate radial inward movement of the lock button assembly 120 before it is possible to slide the operating sleeve 110 against the bias of spring 116. As best illustrated in FIGS. 3, 6 and 12, the lock button assembly 120 includes a stamped metal lock button element 122 which is suitably mounted in an opening 124 formed through the operating sleeve 110. This allows the outer surface of the element 122 to be exposed for manual access. The button element 122 is maintained in its operating position by a leaf spring element 126 (see FIGS. 3 and 12) which has an end portion 128 suitably received in a recess formed in the interior of the operating sleeve 110. The upper end or left hand portion of the leaf spring 126 is suitably received under the button 122 and maintains it biased to the position shown in FIG. 6. In the FIG. 6 position, the pair of stop elements 130 extend upwardly from the surface of element 122 to a position for engagement with the end 26A of sleeve 26. As shown in FIG. 6, this prevents axial movement of operating sleeve 110 unless the button 122 is pivoted inwardly to a position wherein the elements 130 can pass under the sleeve 26. FIG. 3 illustrates the button element 122 in this depressed position. With respect to the button 122 it should be noted that it is arranged such that considering the positioning of the spring 126 and the shape of the button 122 rotation takes of this button during the release operation takes place about the inner corner of opening 124. Since the rotation is about an axis that is further inward than the OD of the operating sleeve release is less likely to be a problem with this particular design.

Referring to FIGS. 5 and 6, the overall arrangement of the stem assembly B will now be described. Basically, the stem assembly B comprises a main stem body assembly F which is a two part assembly comprises a main body component 150 and a threadedly connected stem component 152. The main body component 150 is generally cylindrical with external wrench flats as shown in FIG. 1. A first end 154 is suitably provided with internal threads to permit connection of the stem assembly to associated piping, tubing or the like. The second end 156 is threadedly connected to the stem member 152 and sealing between the components 150 and 152 is accomplished by a seal ring 158 captured between suitable internal shoulders. The stem member 152 is provided with a stepped diameter internal passageway 160 which terminates in a reduced diameter outer end which receives the generally cylindrical poppet valve member G. A suitable 0-ring 162 and an associated backup ring 164 is received in a groove 166 formed about the inner end of stem 152. The 0-ring 162 is sized so as to be closely received about the outer surface of the poppet G to provide a fluid tight seal relative thereto. Outward movement of the poppet is limited by cooperating shoulder 170 and 172 formed on the poppet and the passageway 160 respectively.

As previously mentioned, the poppet element G is maintained continually under a bias toward the position illustrated in FIG. 5 by the previously mentioned spring 14 and the guide assembly H.

Figure 13:
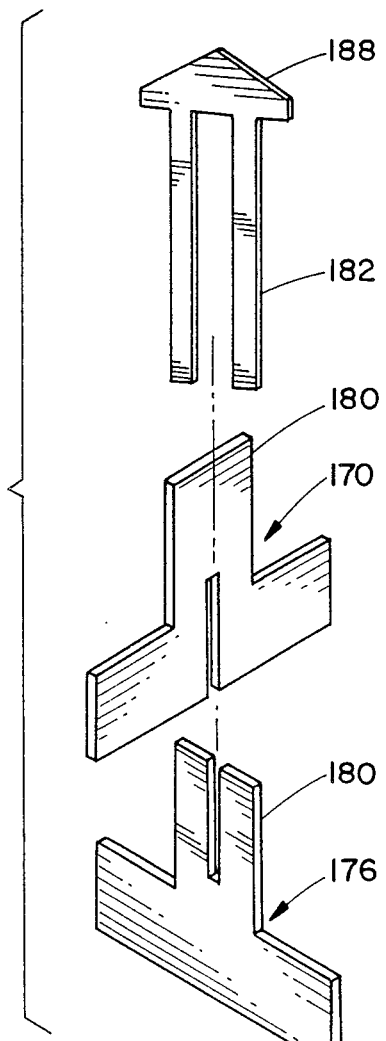

The guide assembly H is best shown in FIG. 13 and comprises a first support member 176 which is comprised of two generally T-shaped components 177, 178 which are interfitted as shown to provide a support base and upwardly extending guide stems 180. The support base and the guide stem have a generally X-shaped configuration in planes transverse to their longitudinal axis. A movable guide member 182 is provided with a central elongated slot 184 to provide a pair of legs 186 which can extend on diametrically opposite sides of the guide post 180 for guide movement relative thereto A pointed outer end 188 on the member 182 is arranged to engage within an internal bore 190 formed in the poppet element G. As can be appreciated, this assembly guides the poppet during reciprocatory movement from the position shown in FIG. 5 to the open position shown in FIG. 6. The exterior surface of the stem portion 152 is provided with a pair of axially circumferentially extending grooves 200 and 202. The axially outer groove 200 is arranged to provide a point of engagement for the slide hooks 80. As illustrated in FIG. 7 the hook 80 has an inwardly extending hook end portion 204 which is adapted to be received within the groove 200 when the components are in the coupled position of FIGS. 6 and 7. Similarly, the groove 202 is arranged to receive the locking dogs 94 and maintain the components in the coupled position shown in FIG. 6. It should be appreciated that the contour of the groove 202 is such as to provide a camming action against the suitable inclined inner end of the locking dogs 94. Thus, when the operating sleeve 110 is moved to its leftmost position the stem assembly B can be withdrawn from the body assembly A. During this withdrawal motion, the locking dogs 98 are cammed outwardly and the sleeve member 44 is pulled to the closed position of FIG. 3 because of the engagement between the sleeve hooks and the groove 200 in stem member 152. When the sleeve hooks reach the position shown in FIG. 3 a radial relief section 210 in groove 90 allows the sleeve hooks to move radially outward releasing the stem element 152.

As is apparent, the design of the slide hooks and their relationship to the stem coupling assembly B is such that the design can readily be used to provide a keyed arrangement between various different coupling members. Note that by shaping or modifying the configuration of the stem engaging portion of the hook 80, and by changing its axial length relative to the stem, it is possible to limit the stem assemblies which can be connected with any particular body assembly. This provides an extremely simple and rapid way of assuring that only matched pairs of body and stem coupling assemblies can be joined. Thus, matched, coded coupling sets can be provided merely by changing the stem member 152 on the stem coupling assembly and the pairs of hooks 80. Note that if there is not a proper match between the hook portion of the slide hook 80 and the groove 202 of the mating stem, it is not possible for the components to be assembled. This is apparent from FIG. 3. That is, if the hook member 80 cannot move radially inward into engagement in a corresponding groove 202 on the stem coupling assembly B, it cannot pivot inwardly to fit within the radially reduced section of groove 90. This, of course, prevents axial engagement and connection of the components.

The invention has been described with reference to a preferred embodiment, obviously modifications and alterations of this preferred embodiment will occur to others upon a reading and understanding of the specification. It is, of course, intended to include all such alterations and modifications as part of the invention insofar as they come within the scope of the claims hereto.

What is claimed is:

1. A coupling member for a quick connect/disconnect coupling comprising:
   an elongated hollow body having a longitudinal axis and a valve internally supported therein and defining therewith an annular chamber having an axially open end for receiving a mating coupling component; a cylindrical slide sleeve supported by said body for axial movement in said annual chamber between a closed position engaging said valve and an open position axially displaced from said valve; a cylindrical wiper member mounted for sliding movement on said cylindrical slide sleeve, said cylindrical wiper member having an end face which generally fills the open end of said annular chamber in the area radially outward of said cylindrical slide sleeve; and,
   at least one slide closing hook for moving said cylindrical slide sleeve to said closed position, said closing hook having a body located radially outward of said cylindrical wiper member and a finger portion extending radially inwardly through an opening in said cylindrical wiper member into driving engagement with said cylindrical slide sleeve.

2. A coupling member as defined in claim 1 including interengaging means between said cylindrical wiper member and said hook for preventing radial separation of said hook and said wiper member while permitting relative axial movement.

3. A coupling member as defined in claim 1 including biasing means for maintaining said cylindrical slide sleeve and said wiper member axially biased toward said open end of said annular chamber.

4. A coupling member as defined in claim 1 wherein said hollow body includes groove means for axially guiding said closing hook and said cylindrical wiper member.

5. A coupling member as defined in claim 1 wherein said hook member includes an outer free end spaced axially from said finger and having a portion adapted to engage a mating coupling component.

6. A coupling member as defined in claim 1 wherein said cylindrical wiper member includes a resilient seal extending generally radially inward from said end face into sealing engagement with said cylindrical slide sleeve.

7. A coupling member as defined in claim 1 including a plurality of said slide closing hooks positioned at circumferentially spaced locations about said cylindrical slide sleeve.

8. A coupling member as defined in claim 1 including a plurality of radially movable locking dog detent members carried by said body radially outward of said annular chamber for selectively connecting said coupling member to a mating coupling component; and, an operating sleeve surrounding said body for controlling the radial movement of said locking dogs.

9. A coupling member as defined in claim 8 wherein said cylindrical wiper member is located to limit the radial inward movement of said locking dogs when said wiper member is in its axially outermost position.

10. A coupling member for a quick connect/disconnect coupling comprising:
    an elongated hollow body defining an annular chamber with an open outer end and having a longitudinal axis and a valve internally supported therein against axial movement relative thereto; a slide sleeve supported by said body for axial movement between a closed position engaging said valve and an open position axially displaced from said valve; first and second latch means respectively carried by said body and said slide sleeve and directly engagable with a cooperating coupling member for releasably connecting said coupling member with the cooperating coupling member by engagement of both said first and second latch means with the cooperating coupling member, said first latch means comprising locking dogs movable radially inwardly and outwardly between inward latched positions and outward unlatched positions; and, said second latch means being substantially fixed against axial movement relative to said slide sleeve and comprising latch hooks each having a finger portion extending generally radially inward into driving engagement with said slide sleeve; a cylindrical wiper member encircling said slide sleeve and positioned between said slide sleeve and said latch hooks; and, said cylindrical wiper member including slots and cooperating surface means for maintaining said finger portion in driving engagement with said slide sleeve.

11. A coupling member as defined in claim 10 including biasing means acting on said slide sleeve and said cylindrical wiper member for maintaining said slide sleeve and said cylindrical wiper member continually biased in a direction to close said valve.

12. A coupling member as defined in claim 10 wherein said cylindrical wiper member includes an end face which generally closes the open outer end of said annular chamber in the area radially outward of said slide sleeve when said slide sleeve is in said closed position.

13. A coupling member as defined in claim 12 wherein said cylindrical wiper member includes a resilient seal means carried adjacent said end face for engaging said slide sleeve and sealing against entry of dirt into said annular chamber when said slide sleeve is in said closed position.

14. A coupling member as defined in claim 10 wherein said valve comprises a rigid bolt member extending axially of said annular chamber and terminating in a free end adjacent the open outer end of said chamber; and a resilient valve seal extending about the free end for sealing engagement with said slide sleeve.

15. A coupling member as defined in claim 14 wherein said slide sleeve has a generally cylindrical configuration and is mounted for axial movement on said body circumferentially of said rigid bolt member.

16. A coupling as defined in claim 14 wherein said rigid bolt member has a maximum outer diameter portion which is greater than the minimum internal diameter of said slide sleeve.

17. A coupling as defined in claim 16 wherein movement of said slide sleeve in a direction axially outwardly of said annular chamber in a direction toward said free end is limited by an internal shoulder in said body.

18. A coupling member for a quick connect/disconnect coupling comprising:
a first elongated hollow body member having a longitudinal axis and defining a generally cylindrical chamber opening axially outwardly of an end of said body, an internal valve member supported in said chamber axially thereof; a cylindrical slide sleeve supported in said chamber for movement between a closed position engaging said valve and an open position axially spaced from said valve; locking detent means carried on diametrically opposite sides of said body in radially extending openings permitting movement of said detent means along a radial path between a first radially inner position for connecting a cooperating coupling component and a second radially outer position for disconnecting the cooperating coupling component; an operating sleeve positioned about said body for sliding movement axially thereof for moving said detent means to said first position; said body having a generally elliptical cross-section in planes perpendicular to said longitudinally axis with the major axis of said elliptical cross-section lying generally perpendicular to the radial path of movement of said detent means.

19. The coupling member as defined in claim 18 wherein said operating sleeve has internal camming surfaces which engage said detent means to move said detent means to said first position.

20. The coupling member as defined in claim 19 wherein said operating sleeve has a generally elliptical outer cross-section in planes perpendicular to said longitudinal axis and passing through said camming surfaces.

21. The coupling member as defined in claim 20 wherein the major axis of the elliptical cross-section of said operating sleeve is generally perpendicular to the major axis of the elliptical cross-section of said body.

22. The coupling member as defined in claim 19 including spring means biasing said operating sleeve in a direction to move said detent means to said inner position.

23. A coupling member for a quick connect/disconnect coupling comprising:
an elongated hollow body having a longitudinal axis and a valve internally supported therein and defining therewith an annular chamber having an axially open end for receiving a mating coupling component; a cylindrical slide sleeve supported by said body for axial movement in said annular chamber between a closed position engaging said valve and an open position axially displaced from said valve; a cylindrical wiper member mounted for sliding movement on said cylindrical slide sleeve and having an end face which generally fills the open end of said annular chamber; a plurality of latch dog members carried by said body for connecting said coupling member to a mating coupling member, each of said latch dog members being mounted for radial movement between an inward latching position and an outward release position, said latch dog members being received in respective slots formed through said body transversely of said longitudinal axis, each said slot having an inner rectangular opening joining said annular chamber with each said latch dog member having a portion which is received in said inner rectangular opening throughout movement between said inward and outward positions.

24. The coupling member as defined in claim 23 including at least one closing hook for moving said cylindrical slide sleeve to said closed position, said slide closing hook having a hook body located radially outward of said cylindrical wiper member and a finger portion extending radially inwardly through an opening in said cylindrical wiper member into driving engagement with said cylindrical slide sleeve.

25. The coupling member as defined in claim 23 wherein said cylindrical wiper member is positioned to move from a first position radially aligned with said rectangular openings to a second position spaced axially therefrom.

26. The coupling member as defined in claim 23 wherein said inner rectangular opening is formed by first grooves which are formed axially of said annular chamber to intersect said slots.

27. The coupling member as defined in claim 26 wherein said body has a generally elliptical cross-section in planes perpendicular to said longitudinal axis and said latch members are constrained to move radially generally along the minor axis of said elliptical cross-section.

28. A coupling member as defined in claim 24 wherein said hollow body includes a second groove for axially guiding said hook and said wiper member.

29. A coupling member as defined in claim 28 wherein said hook member includes an outer free end spaced axially from said finger and adapted to engage a mating coupling component.

30. A coupling member as defined in claim 29 wherein said cylindrical wiper member includes a resilient seal extending generally radially inward from said end face into sealing engagement with said slide.

31. A coupling member for a quick connect/disconnect coupling comprising:
an elongated hollow body defining an annular chamber with an open outer end and having a longitudinal axis and a valve internally supported therein against axial movement relative thereto; a slide sleeve supported by said body for axial movement between a closed position engaging said valve and an open position axially displaced from said valve; first and second latch means respectively carried by said body and said slide sleeve and directly engageable with a cooperating coupling member for releasably connecting said coupling member with the cooperating coupling member by engagement of both said first and second latch means with the cooperating coupling member, said first latch means comprising locking dogs movable radially inwardly and outwardly between inward latched positions and outward unlatched positions; and said hollow body having a generally elliptical cross-section in planes perpendicular to said longitudinal axis with means constraining said locking dogs for movement along a path generally coextensive with the minor axis of said elliptical cross-section.

32. The coupling member as defined in claim 31 including an operating sleeve surrounding said body and mounted for axial movement for controlling the radial movement of said locking dogs.

33. The coupling member as defined in claim 32 wherein said operating sleeve has an elliptical cross-section in planes perpendicular to said longitudinal axis, and means for constraining said operating sleeve for axial movement with the minor axis of its elliptical cross-section perpendicular to the minor axis of the elliptical cross-section of said body.

34. The coupling member as defined in claim 32 wherein said latch means carried by said slide sleeve are substantially fixed against axial movement relative to said slide and comprise latch hooks each having a finger portion extending generally radially inward into driving engagement with said slide sleeve; and, a cylindrical wiper member positioned between said slide sleeve and said latch hooks and including slots and cooperating surface means for maintaining said finger positions in driving engagement with said slide sleeve.

35. A coupling member as defined in claim 34 including biasing means acting on said slide and said wiper member for maintaining said slide sleeve and said wiper member continually biased in a direction to close said valve.

36. A coupling member as defined in claim 31 wherein said valve comprises a rigid bolt member extending axially of said annular chamber and terminating in a free end adjacent the open outer end of said chamber; and a resilient valve seal extending about the free end for sealing engagement with said slide sleeve.

37. A coupling member as defined in claim 36 wherein said slide sleeve has a generally cylindrical configuration and is mounted for axial movement on said body circumferentially of said rigid bolt member.

38. A coupling as defined in claim 36 wherein said rigid bolt member has a maximum outer diameter portion which is greater than the minimum internal diameter of said slide sleeve.

39. A coupling as defined in claim 38 wherein movement of said slide sleeve in a direction axially outwardly of said annular chamber in a direction toward said free end is limited by an internal shoulder in said body.

40. A coupling as defined in claim 36 wherein said rigid bolt member is mounted in said hollow body and mechanically joined thereto.

41. A coupling member for a quick connect/disconnect coupling comprising:

an elongated hollow body having a longitudinal axis and a valve internally supported therein and defining therewith an annular chamber having an axially open end for receiving a mating coupling component; a cylindrical slide sleeve supported by said body for axial movement in said annular chamber between a closed position engaging said valve and an open position axially displaced from said valve; said valve including an end portion carrying a resilient seal which is circumferentially engaged by said slide sleeve when said slide is in said closed position, said resilient seal comprising an 0-ring positioned in a circumferential groove formed about the end portion of said valve, a relative rigid back-up ring positioned in said groove adjacent said O-ring said back-up ring having an open inner diameter substantially less than the open inner diameter of said O-ring, and said groove being contoured with stepped diameter portions to closely engage the open inner diameters of said O-ring and said back-up ring.

42. A coupling member for a quick connect/disconnect coupling comprising:

an elongated hollow body having a longitudinal axis and a valve internally supported therein and defining therewith an annular chamber having an axially open outer end for receiving a mating coupling component; a cylindrical slide sleeve supported by said body for axial movement in said annular chamber between a closed position engaging said valve and an open position axially displaced from said valve; a cylindrical wiper member mounted for sliding movement on said cylindrical slide sleeve in surrounding relationship thereto and having an end face lying in the open outer end of said annular chamber radially outward of said cylindrical slide sleeve and carrying a resilient wiper element which extends radially inward into sliding engagement with the exterior of said cylindrical slide sleeve; and, spring means for maintaining said slide and said wiper member continuously biased toward the open outer end of said hollow body.

43. A coupling member as defined in claim 42 wherein said cylindrical slide sleeve includes a radially extending flange for limiting movement in the direction of said axially open end.

44. A coupling member for a quick connect/disconnect coupling comprising:

an elongated hollow outer body having a longitudinal axis and carrying an inner body portion which cooperates therewith to define an annular chamber having an axially open end for receiving a mating coupling component; locking detentes carried by the outer body for radial movement between an outer position for receiving the mating coupling component and an inner position for coupling with the said mating coupling component; a cylindrical slide sleeve supported by the inner body portion for movement between first and second axially displaced positions; a cylindrical wiper sleeve positioned on the slide sleeve in surrounding relationship thereto for axial movement relative thereto; and, at least one slide hook for moving said slide sleeve to said first position, said slide hook having a body located radially outward of said wiper sleeve and a finger portion extending radially inwardly through an opening in said cylindrical wiper sleeve into driving engagement with said slide sleeve.

45. A coupling member as defined in claim 44 including interenagaging means between said cylindrical wiper sleeve and said hook for preventing radial separation of said hook and said wiper sleeve while permitting relative axial movement.

46. A coupling member as defined in claim 44 including biasing means for maintaining said cylindrical slide sleeve and said cylindrical wiper sleeve axially biased toward said open end of said annular chamber.

47. A coupling member as defined in claim 44 wherein said hollow body includes groove means for axially guiding said hook and said cylindrical wiper sleeve.

48. A coupling member as defined in claim 44 wherein said hook includes an outer free end spaced axially from said finger and having a portion adapted to engage a mating coupling component.

49. A coupling member as defined in claim 44 wherein said cylindrical wiper sleeve includes a resilient seal extending generally radially inward from said end face into sealing engagement with said slide.

50. A coupling member as defined in claim 44 including a plurality of said slide hooks positioned at circumferentially spaced locations about said slide sleeve.

51. A coupling member as defined in claim 44 wherein said wiper sleeve is located to limit the radial inward movement of said detents when said cylindrical wiper sleeve is in its axially outermost position.

* * * * *